United States Patent
Lentes et al.

(10) Patent No.: US 9,676,643 B2
(45) Date of Patent: *Jun. 13, 2017

(54) METHOD FOR PRODUCING GLASSES, GLASS CERAMICS AND THE USE OF SAME

(71) Applicant: SCHOTT AG, Mainz (DE)

(72) Inventors: Frank-Thomas Lentes, Bingen (DE); Karin Naumann, Ober-Olm (DE); Ulrich Schiffner, Mainz (DE); Friedrich Siebers, Nierstein (DE); Christian Mueller, Mainz (DE); Klaus Schoenberger, Mainz (DE); Evelin Weiss, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,662

(22) Filed: Aug. 20, 2014

(65) Prior Publication Data

US 2014/0356609 A1    Dec. 4, 2014

Related U.S. Application Data

(63) Continuation of application No. PCT/EP2013/053153, filed on Feb. 18, 2013.

(30) Foreign Application Priority Data

Feb. 22, 2012    (DE) .................. 10 2012 202 696

(51) Int. Cl.
   *C03B 5/225*    (2006.01)
   *C03C 1/00*     (2006.01)
   (Continued)

(52) U.S. Cl.
   CPC .............. *C03B 5/225* (2013.01); *C03C 1/004* (2013.01); *C03C 3/085* (2013.01); *C03C 3/087* (2013.01);
   (Continued)

(58) Field of Classification Search
   CPC ..................................................... C03B 5/225
   See application file for complete search history.

(56) References Cited

U.S. PATENT DOCUMENTS 5,194,081 A * 3/1993 Trevelyan ............... C03B 3/02
                                                      65/135.1
6,376,403 B1   4/2002 Koyama
           (Continued)

FOREIGN PATENT DOCUMENTS

CN            1192981 C     3/2005
CN          101506109 A     8/2009
            (Continued)

OTHER PUBLICATIONS

Jepsen-Marwedel et al. "Glastechnische Fabrikationsfehler" 4. Auflage, Springer-Verlag, 2011 with English translation, 7 pages.
(Continued)

*Primary Examiner* — Cynthia Szewczyk
(74) *Attorney, Agent, or Firm* — Ohlandt, Greeley, Ruggiero & Perle, LLP

(57) ABSTRACT

A method for producing bubble-free glasses is provided, in which a glass mixture that is arsenic-free, antimony-free and tin-free with the exception of any unavoidable raw material impurities and at least one sulfate compound as a refining agent are used. The glass mixture and refining agent are melted and primarily refined in a first region of a melting tank, an average melting temperature (T1) is set at T1>1580° C. and an average melt residence time (t1) is set at t1>2 hours. A secondary refinement is carried out in a second region, an average melting temperature (T2) is set at T2>1660° C. and an average melt residence time (t2) is set at t2>1 hour, and the proportion of the $SO_3$ resulting from decomposition of the sulfate is reduced to less than 0.002 wt. %.

13 Claims, 2 Drawing Sheets

(51) Int. Cl.
  *C03C 10/00* (2006.01)
  *C03C 3/085* (2006.01)
  *C03C 3/087* (2006.01)

(52) U.S. Cl.
  CPC ...... *C03C 10/0018* (2013.01); *C03C 10/0027* (2013.01); *C03C 10/0036* (2013.01); *C03C 2203/10* (2013.01); *C03C 2214/20* (2013.01)

(56) References Cited

U.S. PATENT DOCUMENTS

| | | | |
|---|---|---|---|
| 6,460,376 B1 * | 10/2002 | Jeanvoine | C03B 3/005 65/134.2 |
| 6,577,667 B1 * | 6/2003 | Kiefer et al. | C03B 5/021 373/138 |
| 7,763,559 B2 | 7/2010 | Kurachi | |
| 2003/0087745 A1 * | 5/2003 | Peuchert | C03C 3/091 501/66 |
| 2004/0011080 A1 * | 1/2004 | Rodek | C03B 5/021 65/135.1 |
| 2005/0096208 A1 | 5/2005 | Zachau | |
| 2005/0209086 A1 * | 9/2005 | Sugawara | C03C 4/087 501/72 |
| 2008/0206494 A1 | 8/2008 | Kurachi | |
| 2010/0224619 A1 | 9/2010 | Schoenberger | |
| 2011/0160033 A1 | 6/2011 | Yamauchi et al. | |
| 2011/0226231 A1 | 9/2011 | Siebers | |
| 2012/0252652 A1 * | 10/2012 | Dejneka | C03C 1/004 501/64 |
| 2012/0302422 A1 | 11/2012 | Siebers | |
| 2013/0164509 A1 | 6/2013 | Siebers | |
| 2013/0201678 A1 | 8/2013 | Siebers | |

FOREIGN PATENT DOCUMENTS

| | | |
|---|---|---|
| CN | 102066276 A | 5/2011 |
| CN | 102245526 A | 11/2011 |
| DE | 19939771 A1 | 2/2001 |
| DE | 19939787 A1 | 2/2001 |
| DE | 10346197 B4 | 4/2005 |
| DE | 102009011850 B3 | 11/2010 |
| DE | 102009021116 A1 | 11/2010 |
| DE | 102010032113 A1 | 1/2012 |
| EP | 1837312 A1 | 9/2007 |
| EP | 2322491 A1 | 5/2011 |
| JP | 2005053711 A | 3/2005 |
| WO | 2007018910 A2 | 2/2007 |
| WO | 2008029649 A1 | 3/2008 |
| WO | 2008065166 A1 | 6/2008 |
| WO | 2008123942 A1 | 10/2008 |
| WO | 2010040443 A2 | 4/2010 |
| WO | 2012010278 A1 | 1/2012 |

OTHER PUBLICATIONS

English translation of International Search Report dated Apr. 26, 2013 for corresponding PCT/EP2013/053153, 2 pages.
Written Opinion of the International Searching Authority dated Apr. 26, 2013 for corresponding PCT/EP2013/053153, 4 pages.
English translation of International Preliminary Report on Patentability dated Apr. 14, 2014 for corresponding PCT/EP2013/053153, 9 pages.
Chengyu et al., "Handbook of Glass Materials", with English translation, 18 pages.

\* cited by examiner

METHOD FOR PRODUCING GLASSES, GLASS CERAMICS AND THE USE OF SAME

CROSS REFERENCE TO RELATED APPLICATIONS

This application is a continuation of International Application Serial No. PCT/EP2013/053153 filed Feb. 18, 2013, which claims benefit under 35 U.S.C. §119(a) of German Patent Application No. 10 2012 202 696.7, filed Feb. 22, 2012, the entire contents of both of which are incorporated herein by reference.

BACKGROUND

1. Field of the Disclosure

The invention relates to a method for producing glasses, in particular LAS glasses and alkali-free aluminosilicate glasses, as well as glasses for the production of glass ceramics. The invention also relates to glasses and glass ceramics, and the use of same.

2. Description of Related Art

For the production of glass, a mixture or batch is introduced into a furnace melting tank and the batch is melted, the mixture first being converted to the stage of the batch agglomeration phase, which is also designated the raw melting, which describes the melting process of the batch.

A batch cover forms thereby, underneath which the melt moves in the form of a counterclockwise principal flow vortex. A hot melt flow partially detaches from this flow vortex and rises toward the top. This point is called the thermal source point. The source point in a furnace melting tank marks the transfer from the first region into the second region of the furnace tank.

In "Glastechnische Fabrikationsfehler [Technical Glass Manufacturing Defects]", edited by H. Jepsen-Marwedel and R. Brückner, 4th Edition, Springer Publ. Co., it is described that under the influence of high temperature in the furnace melting tank, a thin melt layer, the thickness of which amounts to only several millimeters and which flows off under the effect of gravity, is formed on the surface of the batch. Due to gases erupting from the inside the batch, which form large bubbles and can cause the melt layer to appear full of holes, the newly formed glass melt is pushed away from the batch.

The batch is essentially heated and melted by the flow of glass penetrating below the batch carpet. The reaction gas formed at the hot melt front on the underside of the batch penetrates into the porous batch layer and flows to the top through the hollow spaces.

The increase in temperature inside the batch layer proceeds slowly, so that sufficient time remains for the course of the melt reactions. The reactions in the batch agglomeration phase are different for individual glass systems. In general, however, at first, due to solid-solid reactions, the more reactive components form solid solutions and eutectic phases, which then also accelerate other reactions between the less-reactive batch components due to the formation of the melt.

During the raw melting, up to approximately 1400° C., silicate-forming reactions are concluded and subsequently, the remaining quartz grains, $Al_2O_3$ grains, and zirconium-containing grains are dissolved. In addition to temperature, the quantity of undissolved grains and their size represent determining factors for the rate of dissolution.

Shards, preferably shards specific to the glass type, can be added to the batch in a concentration of up to 50% or more.

Up to 20 wt. % gases, which are bound to the raw materials, are introduced into the furnace melting tank with the batch. Due to the decomposition of these raw materials, particularly the carbonates, huge amounts of gases are released, the principal amount of which is discharged into the furnace atmosphere during the batch agglomeration phase and the raw melting. The remainder of approximately 0.001 to 0.1 vol. % of the evolved quantity of gas still remaining in the form of bubbles after the raw melting, as well as the gases remaining dissolved in the melt, must be removed or must be reduced to an extent that is no longer disruptive during the subsequent refining process.

Primarily during the process of dissolving sand grains and zirconium-containing grains, small gas bubbles arise on them that must also be removed from the glass melt.

The object of the refining is to remove bubbles that are still present, to reduce the concentration of dissolved gases, which could give rise to post-gases, and to homogenize the melt. For this purpose, thermal, mechanical, and chemical refining methods or a combination thereof are used in glass technology.

All technical-process measures for refining have the objective of decreasing the rise velocity v of bubbles and thus the time for the bubbles to rise. The rise velocity v of bubbles with a diameter d is given according to Stokes by:

$$v = \frac{1}{18} \frac{g\rho d^2}{\eta}.$$

(g: acceleration due to gravity; $\rho$: density of the glass melt, $\eta$: viscosity of the glass melt)

In order to increase the bubble rise velocity, two parameters can be changed essentially: the diameter of the bubbles d can be increased (very effective due to $d^2$) and/or the viscosity of the glass melt can be reduced by increasing the temperature in the refining region.

It is described in DE 199 39 771 A1 that in general two principal refining methods are known, which differ essentially by the type and manner of producing the refining gas.

In the physical refining method, the viscosity of the glass melt is reduced by increasing the temperature. Therefore, in order to reduce the viscosity during the refining, higher temperatures are established in the glass melt than in the melting and standing regions. The higher the refining temperature can be selected in each case, the more effective is the removal of bubbles from the melt. In this case, the viscosity of the melt should be $<10^2$ dPa·s as much as this is possible. The maximum permissible refining temperature, however, is limited by the temperature resistance of the wall material of the melting aggregate used each time, and is approximately 1720° C. in conventional furnace melting tanks.

Most frequently chemical refining methods are used. The principle here is that compounds are added to the batch that can either decompose and give rise to gases or which are volatile at higher temperatures, or which deliver gases in an equilibrium reaction at higher temperatures. These respective gases diffuse into the bubbles that are present and enlarge them. For example, sodium sulfate that is used, e.g., for the refining of soda-lime glasses belongs to the first group of compounds. In this case, $SO_2$ and $O_2$ are delivered in a temperature range of 1100° C. to 1450° C. with a maximum at 1380° C. This temperature range approximately corresponds to the refining range of such glasses.

By way of example, sodium chlorides belong to the second group of compounds, and polyvalent ions such as $As_2O_3$ or $SnO_2$ belong to the last group of compounds.

DE 10 2009 021 116 A1 discloses a method for producing borosilicate glasses with the use of vanadium pentoxide ($V_2O_5$) as a refining agent. The glasses produced are only designated as bubble-poor.

Glasses for the production of transparent, colored glass ceramics, for the production of which $SnO_2$ or sulfate compounds, among others, are used as refining agents, are known from DE 199 39 787 A1. These refining agents are utilized as replacements for the refining agents, arsenic oxide or antimony oxide. The high-temperature refining occurs at temperatures of more than 1975° C. Information on the number of bubbles obtained, however, is not given for glasses containing these types of refining agents.

It has been shown that with the use of sulfates during high-temperature refining above 1750° C., spontaneous new bubble formation occurs (so-called reboil bubbles) due to the greatly increasing partial pressures of $O_2$ and particularly of $SO_2$ to >5 bars. The low bubble concentration achieved in the upstream refining stages increases again thereby, so that a bubble concentration of >2/kg results in the product.

SUMMARY

The object of the invention consists of indicating a method for producing bubble-free glasses, in particular LAS glasses and alkali-free aluminosilicate glasses, and bubble-free glass ceramics, which do not contain toxic refining-agent components or refining agents containing tin.

It is also an object of the invention to indicate transparent colored, and transparent colorless glasses and glass ceramics that are free of toxic as well as tin-containing refining-agent components and satisfy the high requirements for quality with respect to absence of bubbles.

Free of toxic refining agents and of tin is to be understood in the sense that except for natural impurities of the raw materials used, arsenic, antimony and tin are contained in concentrations of less than 100 ppm in the batch.

Bubble-free and free of bubbles are understood to be a bubble concentration of <2/kg, a bubble denoting a gas inclusion with a diameter >100 μm.

This object is achieved by the features with respect to the method for producing glasses disclosed herein.

A glass batch that is free of arsenic, antimony and tin is used, wherein at least one sulfate compound is used as the refining agent. In a first region of the melting tank, the average melting temperature $T_1$ is set at $T_1$>1580° C., and the average residence time $t_1$ of the melt is set at $t_1$>2 hours. In a second region, the average melting temperature $T_2$ is set at $T_2$>1660° C., and the average residence time $t_2$ of the melt is set at $t_2$>1 hour. The proportion of $SO_3$ arising due to the decomposition of the sulfate compound is reduced to less than 0.002 wt. % at the latest during the conducting of the secondary refining.

The value of $SO_3$ may already be adjusted to <0.002 wt. % after the primary refining. It is important that the $SO_3$ value is <0.002 wt. % at the latest after the secondary refining.

A high-temperature refining is conducted after the secondary refining.

Primary refining is understood to be the removal of bubbles (and dissolved gases) in the melting region, i.e., in the region of the first flow vortex up to the source point. In this way, the bubble concentration is already reduced by several orders of magnitude from approximately $10^7$/kg to approximately $10^4$/kg.

Secondary refining is understood to be the process after the first source point (i.e., after the primary refining), wherein, by means of an increase in the temperature of the melt by 50° C. and more, for example, both its viscosity is reduced and simultaneously, the bubble diameter of the bubbles that are present is increased by diffusion of gases from the melt, so that the bubbles rise more easily and can exit the melt.

The regions for the primary refining and the secondary refining can be separated by fixtures such as blowing nozzles, walls or suspended stones. Also, the primary refining and the secondary refining can be conducted in two separate chambers or two separate furnace melting tanks. Each region is found in a chamber or a tank, the chambers or tanks being joined together, for example, by means of a channel.

Glasses and glass ceramics are preferably understood as those of LAS glasses as well as alkali-free aluminosilicate glasses and glass ceramics produced from these glasses.

LAS glasses are understood to be lithium-aluminosilicate glasses. For producing glass ceramics, these glasses contain nucleating agents, such as, preferably, $TiO_2$ and $ZrO_2$. The LAS glasses can be converted into glass ceramics in a further thermal process.

In addition to LAS glasses, alkali-free aluminosilicate glasses that contain alkalis in a total concentration of less than 0.2 wt. % can also be produced according to this method.

Average melting temperature is understood to be the time and place-averaged temperature in the region of the respective flow vortex, thus for example, in the first flow vortex.

Average residence time t of the melt in the two regions involved of a furnace melting tank is understood to be:

$$t = \frac{\rho A_i L_i}{\dot{m}}$$

($\dot{m}$: mass throughput [kg/d with d=day]; $\rho$: density of the melt [kg/m$^3$]; $A_i$: cross-sectional surface of the furnace tank in the i-th section [m$^2$]; $L_i$: length of the i-th aggregate section [m]).

The average residence time of the melt in the two regions can be adjusted, e.g., by the length of the furnace tank.

Surprisingly, it has been demonstrated that sulfate compounds can be used as refining agents without the occurrence of the disadvantageous effect of the formation of reboil bubbles during the subsequent high-temperature refining, if the temperature and the residence times in the furnace melting tank are set according to the invention.

It has been shown that the bubble concentration and the sulfur fraction in the glass melt at the end of the furnace tank (after primary and secondary refining) are of crucial importance for obtaining an end product free of bubbles.

It was established that if melting is conducted in the melting furnace at temperatures >1580° C. with residence times >2 h and a primary refining is conducted, a bubble concentration of <5000/kg is obtained, and then, if a secondary refining is conducted at temperatures of >1660° C. with residence times of >1 h, the bubble concentration is further reduced to <1000/kg, preferably <600/kg.

It has been shown that with these values at the end of the secondary refining, with a subsequent high-temperature refining, a glass that is almost completely free of bubbles, with bubble numbers of <2 bubbles/kg can be obtained.

An $SO_3$ content in the melt of <0.002 wt. %, preferably of <0.0018 wt. %, and, in particular, of <0.0015 wt. %, at the latest after the secondary refining, guarantees that the reboil effect is not observed during the high-temperature refining. The smaller the $SO_3$ proportion is, the more effectively is the reboil effect suppressed.

The invention is thus based on the knowledge that an almost complete reaction of the sulfate compound must be aimed at, before the high-temperature refining is conducted. This means that the $SO_3$ present in the melt, according to the following reaction

is nearly completely removed, so that the residual content of $SO_3$ is less than 0.002 wt. %. preferably <0.0018 wt. %, in particular <0.0015 wt. %.

It is thus desirable to break down $SO_3$ (sulfate) into $SO_2$ and $O_2$, already preferably in the stage of the raw melting and during the primary refining, so that the evolved quantity of gas can reinforce the discharging of the gases contained in the batch and in the raw melt. Thus, the number of starting bubbles is significantly reduced for the subsequent secondary refining. During the secondary refining, there is almost no conversion of $SO_3$ or only a small conversion, each time depending on how much $SO_3$ has been consumed in the region of the primary refining. Still unreacted $SO_3$ after the primary refining is not disruptive, since these glasses do not contain other, added polyvalent oxides as refining agents, the reaction of which would be prevented by the unconsumed $SO_3$ in the secondary refining. $SO_3$ (sulfate) would suppress the decomposition of the polyvalent ions that is aimed at in the secondary refining, due to the coupled equilibrium. In the case of glasses according to the invention, it is thus not crucial how much $SO_3$ is converted into $SO_2$ and $O_2$ after the primary refining, since the melt does not contain additional polyvalent oxides, but it is crucial that the residual content of $SO_3$ after the secondary refining is less than 0.002 wt. %, preferably <0.0018 wt. %, in particular <0.0015 wt. %, in order to be able to conduct a successful high-temperature refining.

It has been shown that by maintaining the temperatures $T_1$ and $T_2$ in combination with the given residence times $t_1$ and $t_2$ and the absence of arsenic, antimony, and tin oxide, the characteristic values of <0.002 wt. % for $SO_3$ and bubble concentrations of <1000 bubbles/kg, preferably <600 bubbles/kg can be achieved, so that the reboil effect is suppressed in the following high-temperature refining, and the glass quality can be increased with respect to the bubble concentration, so that glass with a bubble concentration of <2 bubbles/kg, in particular of <1 bubble/kg can be produced.

A preferred temperature range for $T_1$ is >1580° C. to 1660° C., particularly >1580° C. to 1640° C., and more preferably >1600° C. to 1640° C.

A preferred temperature range for $T_2$ is >1660° C. to 1720° C., particularly >1660° C. to 1700° C.

The average residence time $t_1$ preferably lies in the range of >2 h to 25 h, particularly >2 h to 15 h, and more preferably in the range of >2 h to 10 h.

The average residence time $t_2$ preferably lies in the range of >1 h to 10 h, particularly >1 h to 6 h, and more preferably in the range of >1 h to 3 h.

It is preferred rather to lengthen the average residence time $t_1$ than the average residence time $t_2$, since it has been shown that the sulfate decomposition and the gas flow in the first region of the furnace tank are greater than in the second region. For the ratio of $t_1/t_2$ therefore, $2<t_1/t_2<25$ preferably applies, particularly $10<t_1/t_2<25$.

Preferably, at least one alkali sulfate and/or at least one alkaline-earth sulfate is added to the glass batch as a refining agent. Sodium sulfate is preferably employed in the case of alkali sulfates, and $BaSO_4$ and/or $CaSO_4$ are/is preferably employed in the case of alkaline-earth sulfates. The higher the temperature is when melting occurs, the alkaline-earth sulfates are more preferred in comparison to alkali sulfates, since the evolution of $SO_2$ and $O_2$ occurs at higher temperatures.

The sulfate compound is preferably added to the glass batch in an amount that corresponds to 0.05 to 1 wt. % $SO_3$. If the value goes below 0.05 wt. %, then not enough gases are removed in the region of the primary and secondary refining, and the bubble concentration is >1000/kg at the end of the furnace tank.

If it exceeds a maximum of 1 wt. %, there is the risk of excessive evolution of gas during the melting and the primary refining, combined with foaming on the glass melt and no longer sufficient removal of bubbles. In addition, the amount of $SO_2$ increases in the off-gas.

Additional preferred proportions of the sulfate compound are those that correspond to 0.1 to 0.8 wt. %, particularly 0.1 to 0.6 wt. % $SO_3$.

It has also been shown that the sulfate compound reduces the number of melting remnants. For example, up to 4 wt. % zirconium oxides are melted more rapidly due to the sulfate compound, since the addition of sulfate compound clearly improves the wetting of the zirconium-containing grains and also the sand grains, and suppresses a segregation of the reaction partners during the melting. The dissolution of remnants usually leads to the formation of new, small bubbles. If the dissolution of remnants is spread out over the refining region, it is not possible to obtain a bubble-free glass. For this reason, the accelerated dissolution of batch remnants due to the sulfate compound is of great importance for an effective refining.

The raw melting, which describes the transition from the batch to the melt, is characterized by porous batch layers. Depending on the porosity each time, the gases contained in the batch, such as, e.g., $N_2$, $NO_x$ and $CO_2$, can escape more or less easily, and are thus not available in the following processes, or are available only up to a small percentage, for the disruptive bubble formation.

Therefore, a quantity of glass is preferably employed, in which the average grain size of difficult-to-melt components is 10 to 300 μm. Difficult-to-melt components are understood to be the substances: sand ($SiO_2$), $Al_2O_3$, and $ZrO_2$ or zirconium silicates.

The advantage of these grain sizes consists in the fact that the gases contained in the batch can be still better discharged. If the grain size lies in the range of 10 μm to 300 μm, particularly in the range of 100 μm to 250 μm, more preferably in the range of 150 μm to 200 μm, the discharge of the gases contained in the batch is clearly reinforced.

The duration of the melting in the stage of the raw melting can be adjusted by the selection of the average grain size. The courser the batch is, and, in particular, the larger the average grain size of the difficult-to-melt components is selected, then the residence time $t_1$ is also selected longer.

It may also be of advantage to adjust the average residence time of the batch already in the stage of the raw melting, so that only the quantity of refining agent necessary for the primary refining remains.

Preferably, the high-temperature refining is conducted in the form of a physical refining by lowering the viscosity of the melt. Due to the fact that the sulfate compound is used up in the furnace tank by the primary and secondary refining, there is no longer any refining agent available in the high-temperature refining aggregate (except for traces of other gases dissolved in the melt), so that a chemical refining is excluded within the scope of the high-temperature refining.

The high-temperature refining is conducted preferably at temperatures of at least 1750° C. A temperature range of 1750° C. to 2000° C. is preferred. The residence time for the high-temperature refining is at least 12 min., preferably 12 to 20 min., and more preferably at least 15 min.

The bubble concentration is <2/kg, preferably <1/kg after the high-temperature refining.

Preferably, the glass batch is melted in an oxidizing way in the first region. The oxidic melting is produced also by the adjustment of the fossil-fuel burner as well as by the sulfate compound itself and has the advantage that as high a proportion of the sulfate compound as possible is dissolved as $SO_3$ prior to its decomposition.

Preferably, nitrate is added to the glass batch in an amount of 0 to 3 wt. %. The addition of nitrate as an oxidizing agent, particularly of $NaNO_3$, improves the solubility of sulfur in the melt, which acts in a positive way, as long as the all-too-early decomposition of the sulfate compound produced thereby is inhibited. In addition, the reduction of the $O_2$ partial pressure in the melt due to any residues of reducing impurities (e.g., organic compounds in the batch) is avoided.

Both transparent colorless and transparent colored glasses can be produced with the method according to the invention.

A glass or a glass ceramic is designated as transparent, if the transmittance in the wavelength region from 400 nm to 2450 nm amounts to more than 80% for a layer thickness of 4 mm.

A glass or a glass ceramic is designated as colorless, if the chromaticity C* in the CIE-LAB color system is <10 for a glass thickness of 4 mm.

A glass or a glass ceramic is designated as colored, if C*≥10 for a glass thickness of 4 mm. The method can be conducted with a continuous or a discontinuous operating mode.

A continuous operating mode is present if the introduction of raw materials is continuous and almost constant, the raw materials are converted into glass, and the glass is likewise removed in a continuous and almost constant manner at the outlet of the aggregate, so that a flow equilibrium with a largely constant volumetric flow is established inside the melting plant.

A discontinuous operating mode is present, if a melting plant is filled with raw materials, these are converted into glass, and at another time point, a pre-specified glass volume is withdrawn, which corresponds at most to the volume of the melting plant; typically, a specific amount of glass is poured into a mold.

For protection against a possible $O_2$ bubble formation on precious metal components, polyvalent oxides in concentrations of 200 ppm at most can be added to the glass melt.

Another positive effect on the bubble concentration is preferably achieved by additional refining additives, such as halides, e.g., chlorides, fluorides, and/or bromides, which are preferably added up to 1 wt. % to the glass batch.

For further simplification of the melting, up to 70 wt. % of shards can be added to the batch, these shards preferably corresponding to the respective glass composition of the batch.

The method for producing glass ceramics provides that a glass is produced according to the method according to the invention and this glass is converted into a glass ceramic by a thermal post-treatment.

The glass or the glass ceramic is characterized in that the glass or the glass ceramic is free of As, Sb, and Sn except for unavoidable raw-material impurities with concentrations of less than 100 ppm; has a bubble concentration of <2/kg, and has a proportion of $SO_3$ of <0.002 wt. %.

Preferably, the proportion of $SO_3$ is 0.0018 wt. %, in particular 0.0015 wt. %.

This glass or this glass ceramic preferably has the following composition (in wt. %):

| | |
|---|---|
| $Li_2O$ | 2.5-5.5 |
| $Na_2O$ | 0-3.0 |
| $K_2O$ | 0-3.0 |
| $\Sigma Na_2O + K_2O$ | 0-4.0 |
| MgO | 0-3.0 |
| CaO | 0-5.0 |
| SrO | 0-2.0 |
| BaO | 0-4.0 |
| ZnO | 0.1-4.0 |
| $Al_2O_3$ | 15-27 |
| $SiO_2$ | 52-75 |
| $TiO_2$ | 0-5.5 |
| $ZrO_2$ | 0.1-4.0 |
| $B_2O_3$ | 0-4.0 |
| $\Sigma TiO_2 + ZrO_2$ | 0.1-6.0 |
| $P_2O_5$ | 0-8.0 |
| $Nd_2O_3$ | 0-0.4 |

Another preferred composition of this glass or this glass ceramic is as follows (in wt. %):

| | |
|---|---|
| $Li_2O$ | 3.0-5.5 |
| $Na_2O$ | 0-1.5 |
| $K_2O$ | 0-1.5 |
| $\Sigma Na_2O + K_2O$ | 0.2-2.0 |
| MgO | 0-2.0 |
| CaO | 0-4.5 |
| SrO | 0-1.5 |
| BaO | 0-2.5 |
| $\Sigma MgO + CaO + SrO + BaO$ | 0.5-5.0 |
| ZnO | 0.2-3.0 |
| $Al_2O_3$ | 17-25 |
| $SiO_2$ | 55-72 |
| $TiO_2$ | 0-4.0 |
| $ZrO_2$ | 0.1-3.0 |
| $B_2O_3$ | 0-4.0 |
| $\Sigma TiO_2 + ZrO_2$ | 0.5-6.0 |
| $P_2O_5$ | 0-8.0 |
| $Nd_2O_3$ | 0-0.3 |

Preferably, $TiO_2$ is necessarily contained in the composition. The proportion of $TiO_2$ is particularly >0.1 wt. %.

The glass produced according to the invention can be subjected to a hot forming by rolling or preferably in the float method.

It is known from WO 2008/065166 that with the use of $TiO_2$ as a nucleating agent with the simultaneous presence of $Fe_2O_3$, $CeO_2$ or $SnO_2$, interactions occur that reduce the transmission and the color shifts in the direction of yellow to yellow-brown. This effect is particularly strongly expressed in the case of $SnO_2$. For this reason, the use of $SnO_2$ as a refining agent is completely omitted.

Preferably, the transparent, colorless glass or the transparent, colorless glass ceramic with a layer thickness of 4 mm has a light transmission Y of >87% according to the CIE color system and a chromaticity C*<4 according to the CIE-LAB color system. This applies to impurities in the raw materials and those brought about by the process of $Fe_2O_3 \leq 0.024$ wt. %.

The chromaticity C* in the CIE-LAB system is defined by $C^* = \sqrt{A^{*2} + B^{*2}}$, wherein A* and B* are the color coordinates in this system. The color coordinates L*, A*, B* in the CIE-LAB system can be converted in the known way into the color coordinates x and y and the light transmission (brightness) Y of the CIE color system.

The spectral light transmission is measured on ceramized and polished LAS specimens with a thickness of 4 mm in a Perkin-Elmer Lambda 9000. Subsequently, the conversion to light transmission (brightness) Y is carried out with standard light C according to the ASTM Standard 1925/70.

The glass or the glass ceramic can have at least one addition from the group of coloring components V, Cr, Mn, Fe, Co, Cu, Ni, Ce, Se compounds with proportions of up to 1.5 wt. %, whereby transparent, colored glasses and glass ceramics are produced.

Preferred uses of transparent, colored glass ceramics are provided for glass-ceramic cooktops.

Preferred uses of the transparent, colorless glasses or of transparent, colorless glass ceramics are provided for safety glazings in buildings, vehicles, and in the field of personal protection, for viewing windows for displays, for hard-disk substrates, for glass-ceramic cooktops, and for fireplace viewing panels.

DESCRIPTION OF THE DRAWINGS

The invention will be explained below in more detail on the basis of the figures. Herein.

DETAILED DESCRIPTION

Figure 1:
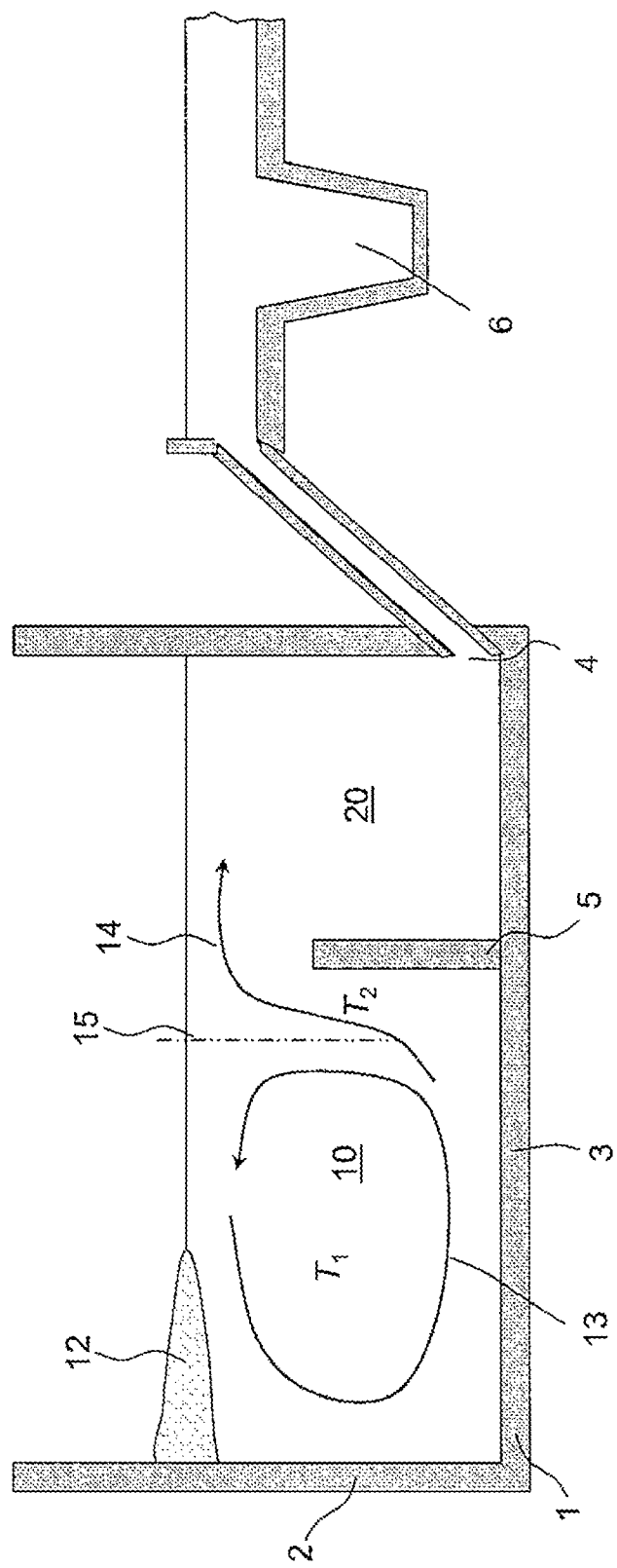
FIG. 1 schematically shows a furnace melting tank with downstream high-temperature aggregate.

A furnace melting tank 1 with a filling wall 2, a bottom wall 3 and an outlet 4 is shown in FIG. 1. The preferred type of furnace tank is a conventional furnace tank that can be heated by fossil fuel with or without supplemental electrical heating.

The furnace melting tank is divided into a first region 10 and a second region 20. The batch is placed in the first region 10, so that initially a raw melt having a porous batch carpet 12 is formed there. Underneath the batch carpet 12 is found a molten batch, in which non-molten particles, particularly the difficult-to-melt components, are still present in part.

Under the batch carpet 12 is formed a counterclockwise principal flow vortex 13, which sweeps past underneath the batch carpet and continually takes up material and converts it into the melt.

This principal flow vortex 13 extends approximately into the central region of the melting furnace 1, whereby partial flows 14 detach from the principal flow vortex 13, and flow into the second region 20. The regions 10 and 20 can be optionally separated by a built-in component, e.g., a wall 5, by which the hot glass melt is forcibly guided to the surface of the melting furnace.

The two regions are separated by the so-called source point 15, which is also designated the hot spot. This is a region with a high local temperature of the melt.

A primary refining is carried out in the first region 10. The temperature $T_1$ in this region 10 lies above 1580° C. In the second region 20, the temperature $T_2$ is clearly higher, i.e., over 1660° C. The secondary refining is conducted in this second region.

The average residence time $t_1$ in the region 10 is more than two hours. The average residence time can be set correspondingly by different parameters, such as, e.g., by the geometric dimensions, particularly the length of the furnace tank.

This is also true for the average residence time $t_2$ in the second region 20, where the average residence time $t_2$ shall be at least one hour. By maintaining the temperature and residence time, it is assured that at the outlet 4, the concentration of $SO_3$ in the melt is <0.002 wt. % and the bubble concentration is <1000/kg.

The outlet 4 is connected to a high-temperature aggregate 6, where the high-temperature refining takes place. The high-temperature refining is conducted at temperatures >1750° C. Since the $SO_3$ proportion is <0.002 wt. %, the undesired reboil effect cannot occur due to this low $SO_3$ content, so that a bubble-free glass (<2 bubbles/kg, preferably <1 bubble/kg) can be produced at the end of the high-temperature aggregate 6.

Figure 2:
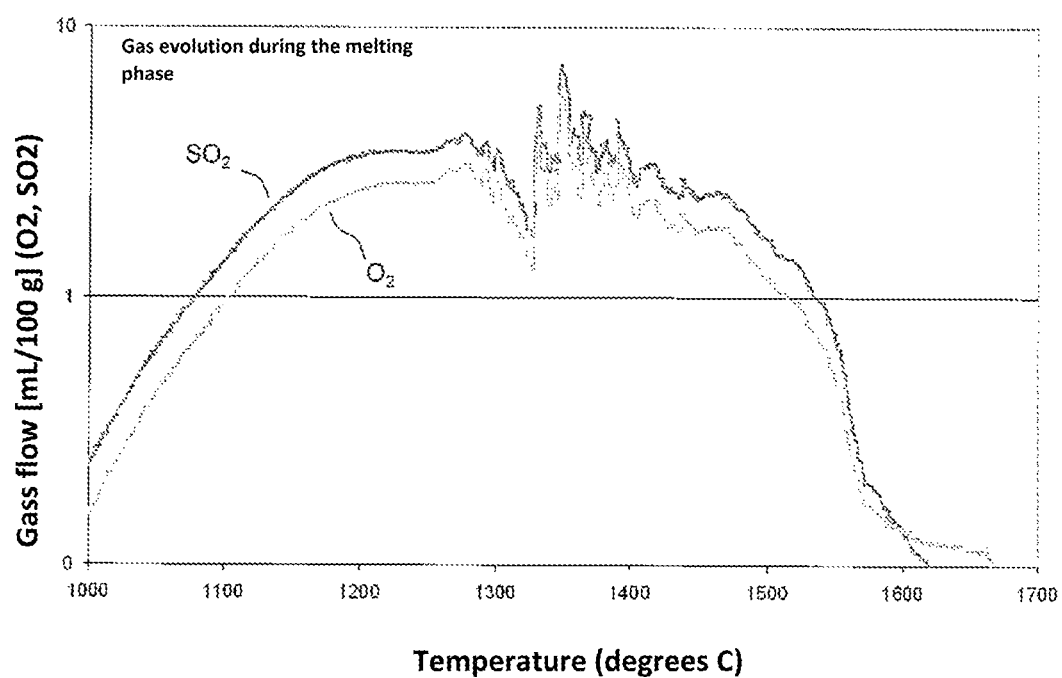
FIG. 2 shows a gas flow/temperature diagram.

The evolved gas flows (Evolved Gas Analysis measurements, abbreviated as EGA measurements) are plotted in FIG. 2 as a function of temperature for the two regions 10 and 20 of an LAS glass composition. For the measurement, 50 g of batch are heated from room temperature to 1680° C. at 8 K/min, and the evolved gases are analyzed as a function of temperature by means of a mass spectrometer. The diagram in FIG. 2 distinguishes between the gas flows of $SO_2$ and $O_2$. From about 1000° C., the evolution of $SO_2$ and $O_2$ begins in the porous batch carpet based on the decomposition of barium sulfate. Gases found between the batch particles, such as air, are removed thereby from the batch carpet (strong fluctuations in the curve course). With increasing temperature, the porous batch carpet transitions into a glass melt and the evolution of $SO_2$ and $O_2$ again decreases. From about 1600° C., the evolution of $SO_2$ decreases to nearly zero. The slower decrease of the $O_2$ from 1600° C. may be caused by impurities.

A pronounced primary refining occurs. Only a small amount of $SO_3$ or even no $SO_3$ is available in the secondary refining, so that it is assured that at the end of the furnace tank, thus after the secondary refining region, the $SO_3$ component is <0.002 wt. %.

The temperatures of the just described gas flows (EGA measurements) cannot be directly converted to furnace tank ratios, since the heating rates and surface-to-volume ratios differ between the laboratory measurements and the furnace tank. The measurements indicate the temperature regions of the evolution of refining gas under laboratory conditions. The actual temperatures of the gas evolution were determined in the small furnace tank test and are shifted to higher temperatures in comparison to the EGA measurements.

The invention will be explained in more detail on the basis of examples:

Compositions 1 to 3 in the following table are glass compositions according to the invention.

TABLE 1

Glass compositions from the following Examples

| Oxides in wt. % | Composition 1 | Composition 2 | Composition 3 | Composition 4 (comparative example) | Composition 5 (comparative example) |
|---|---|---|---|---|---|
| $Al_2O_3$ | 22.2 | 21.5 | 21.6 | 22.2 | 22.1 |
| BaO | 2.02 | — | 0.76 | 2.02 | 1.96 |
| $Fe_2O_3$ | 0.024 | 0.016 | 0.02 | 0.024 | 0.016 |
| $K_2O$ | — | 0.13 | 0.07 | — | — |
| $Li_2O$ | 3.80 | 3.83 | 3.59 | 3.80 | 3.81 |
| MgO | 0.59 | 1.02 | 0.86 | 0.59 | 0.57 |
| CaO | | | 0.12 | | |
| SrO | | | 0.49 | | |
| $Na_2O$ | 0.56 | 0.44 | 0.56 | 0.56 | 0.57 |
| $SiO_2$ | 65.0 | 67.3 | 66.0 | 65.0 | 65.2 |
| $SO_3$ synthesis | 0.52 | 0.47 | 0.26 | | |
| $TiO_2$ | 2.26 | 1.99 | 2.39 | 2.26 | 1.98 |
| ZnO | 1.76 | 1.75 | 1.79 | 1.76 | 1.82 |
| $ZrO_2$ | 1.76 | 1.81 | 1.74 | 1.76 | 1.82 |
| $SnO_2$ | | | | | 0.2 |
| Light transmission Y in % | 88.7 | 88.4 | 88.5 | 88.6 | 86.9 |
| Chromaticity C ° | 3.2 | 3.8 | 3.8 | 3.3 | 4.5 |

$SO_3$ synthesis means: Quantity of $SO_3$ in wt. %; the quantity of $BaSO_4$ that is added to the batch is calculated from the quantity of $SO_3$. All other data are analytically determined values in the glass.

EXAMPLE I

In the laboratory, a 1.4-kg batch of LAS glass composition 1 (without addition of $As_2O_3$, $SnO_2$ and $Sb_2O_3$) was prepared with conventional raw materials (quartz powder, $Al_2O_3$, Al hydroxide, Ba nitrate, Na nitrate, Li carbonate, Ba carbonate, MgO, $TiO_2$, zirconium silicate, ZnO) and 0.53 wt. % $SO_3$ refining agent as Ba sulfate.

The batch was melted without remnants in the air-fuel operating gas furnace at temperatures of $T_1=1620°$ C. with $t_1=3$ h and subsequently stirred in an MF coil in the silica glass crucible and kept for $t_2=3$ h at $T_2=1680°$ C. in order to carry out a secondary refining. After the end of the melting time, the glass was cast and cooled at 20 K/h. Glass produced in this way still contained approximately 600 bubbles/kg of glass. The analyzed $SO_3$ content was 0.00075 wt. %.

After evaluating the glass in the cold state, the glass, which was nearly free of refining agent and $SO_3$-poor, was subjected to a high-temperature refining. For this purpose, cylindrical cores were produced from the just described melt suitable for the crucible of the high-temperature refining. A 55-mm high core was heated in a 140-mL Ir crucible again to 1600° C., kept at 1600° C. for 30 min. for uniform thorough melting, and then heated at 975 K/h to 1925° C. and kept for 12 min at the high temperature. Subsequently, the hot glass was cooled to 1500° C. in approximately 8 min, kept for 10 min, and then thermally annealed to room temperature in the cooling furnace.

The glass was completely free of bubbles, all bubbles were removed, and there was no new bubble formation.

The glass was converted into a glass ceramic by thermal treatment. The glass ceramic with a layer thickness of 4 mm had a light transmission Y according to the CIE color system of 88.7% and a chromaticity C* in the CIE-LAB color system of 3.2.

If the temperatures in the 140-mL high-temperature crucible lie below 1925° C., residence times of at least 15 min are necessary in order to arrive at a bubble-free glass from the glass which is free of refining agent and $SO_3$-poor having bubble numbers of <1000 bubbles/kg. At 2125° C., short residence times are sufficient in order to obtain a bubble-free glass.

EXAMPLE 2

Another LAS glass batch (composition 2 with raw materials comparable to those of Example 1) with 0.47 wt. % $SO_3$ as Na sulfate was melted at $T_1=1580°$ C. with $t_1=3$ h and subsequently melted at $T_2=1660°$ C. only with $t_2=2$ h. The number of bubbles was approximately 950 bubbles/kg. The $SO_3$ content was approximately 0.0010 wt. %.

The higher the bubble number is prior to introduction into the high-temperature crucible (initial bubble number), the higher the refining temperature and/or the longer the residence time must be in the high-temperature refining crucible. At 1950° C. and after 15 min residence time, the glass was free of bubbles.

EXAMPLE 3

Comparative Example with $SO_3>0.0020$ Wt. %

An 8.6-kg LAS glass batch (composition 1) was melted down with 0.53 wt. % $SO_3$ as $BaSO_4$ in the gas furnace for 3 h at 1550° C. and subsequently further melted at 1600° C. for 1 h. The $SO_3$ content remaining in the glass amounted to 0.0022 wt. %. A subsequent high-temperature refining at 1925° C. with 15 min holding time did not lead to a bubble-free glass. The glass contained small bubbles (max. 100 μm diameter), particularly on the walls of the crucible and on the 3-phase interface between glass, crucible, and atmosphere. Based on the partial pressure of the $SO_2$ ($pSO_2$) or of the $SO_3$ concentration, so-called new bubble formation occurred.

EXAMPLE 4

Comparative Example with High Initial Bubble Numbers

An LAS glass batch behaves similarly (composition 1) with 0.53 wt. % $SO_3$ as Ba sulfate, which was melted down in the gas furnace for only 3 h at 1620° C. (without the 2nd temperature step); the glass contained approximately 2000 bubbles/kg and the $SO_3$ content was between 0.0022 and 0.0025 wt. % $SO_3$. After the subsequent high-temperature refining at 1925° C. for a time period of 15 min, the glass was not bubble-free, but rather it contained very small bubbles, many bubbles on the crucible wall and on the 3-phase interface.

Based on these examples, it can be clearly seen that a bubble-free glass can only be produced by maintaining the claimed parameters. The number of bubbles in the comparative examples shows that, in particular, high $SO_3$ contents lead to a new bubble formation in the high-temperature refining aggregate due to poorly selected primary and secondary refining temperatures. Nevertheless, the addition of sulfate in the batch cannot be omitted, since if it were, the bubble numbers of <1000 that are necessary after the primary and secondary refining would not be obtained.

EXAMPLE 5

Comparative Example without Sulfate

A batch of LAS glass composition 4 without addition of a sulfate (without addition of refining agent) showed more than 5000 very small bubbles/kg and melting remnants in the laboratory furnace after 3 h at 1600° C. with subsequent heating to 1660° C. at 300 K/h and a holding time of 2 h. A subsequent high-temperature refining at 1925° C. with 15 min residence time did not lead to a bubble-free glass. The high initial bubble numbers could not be completely eliminated. In addition, batch remnants in the high-temperature crucible are permanent sources of small bubbles, and in fact, are based on the changing chemistry of the glass and the gas solubility.

EXAMPLE 6

The batch of Example 5 (composition 1), of course containing 0.53 wt. % $SO_3$ as Ba sulfate led to a maximum of only 600 bubbles/kg after the same temperature-time treatment, i.e., to clearly smaller bubble numbers after the primary and secondary refining. The melt was completely free of remnants and the $SO_3$ content was 0.0012 wt. %. A subsequent high-temperature refining at 1900° C. with 12 min residence time led to bubble-free glass. All initial bubbles could be reduced and a new bubble formation was not observed.

EXAMPLE 7

An LAS glass composition (composition 3) was melted in a small furnace tank. Commercially available technical raw materials were used (quartz powder, $Al_2O_3$, Al hydroxide, Na nitrate, K carbonate, Li carbonate, Ca carbonate, Sr carbonate, Ba carbonate, MgO, $TiO_2$, zirconium silicate, ZnO, Ba sulfate) with a total content of $Fe_2O_3$ of 0.0200 wt. % The batch contained 0.26 wt. % $SO_3$, added as Ba sulfate. No coloring oxides were added to the batch. 0.56 wt. % $Na_2O$ was added as Na nitrate. After average melting temperatures of 1580° C. to 1600° C. for the primary refining, the melting temperature for the secondary refining was increased to over 1660° C. (average residence times >3 h in each case). Samplings after the furnace tank showed that the glass was melted free of remnants. The number of bubbles was between 200 and a max. 800 bubbles/kg depending on the melting parameters. The content of $SO_3$ in each case was under 0.0012 wt. %.

The subsequent high-temperature refining at temperatures between 1760° C. and approx. 1900° C. with average residence times of 12 to 15 min led to glass with bubble numbers of <1 bubble/kg.

The thus-produced, transparent colorless LAS glass was converted into a glass ceramic by ceramicizing, and light transmission Y and chromaticity C* (color) were measured. The glass ceramic with a layer thickness of 4 mm had a light transmission Y according to the CIE color system of 88.5% and a chromaticity C* in the CIE-LAB color system of 3.8.

EXAMPLE 8

Comparative Example with $SnO_2$ with Respect to Obtainable Light Transmission

An LAS glass composition 5 was melted and refined in the gas furnace in the laboratory in the same way as described in Example 1 and also as in Example 2.

The bubble numbers after the primary and secondary refining were between 200 and 600 bubbles/kg, and $ZrO_2$-containing melting remnants occurred increasingly on the surface.

The thus-produced, colorless LAS glass was converted into a glass ceramic by thermal post-treatment and its transmission and color were measured. The glass ceramic with a layer thickness of 4 mm had a light transmission Y of 86.9% in the CIE color system and a chromaticity C* in the CIE-LAB color system of 4.5 with a 4-mm layer thickness. Due to the addition of $SnO_2$, the transmission clearly decreases and the chromaticity increases, in comparison to the SnO-free, sulfate-refined glass ceramic.

LIST OF REFERENCE NUMBERS

1 Furnace melting tank
2 Filling wall
3 Bottom wall
4 Outlet
5 Wall
6 High-temperature crucible
10 First region
12 Batch carpet
13 Principal flow vortex
14 Partial flow
15 Source point
20 Second region

What is claimed is:
1. A method for producing glasses, comprising:
using a glass batch that is free of arsenic, antimony, and tin except for unavoidable raw-material impurities;
using at least one sulfate compound as refining agent;
melting and primarily refining the glass batch and the refining agent in a first region of a furnace melting tank, wherein in the first region, an average melt temperature $T_1$ is set at 1580° C.<$T_1$≤1660° C. and an average residence time of the melt $t_1$ is set at $t_1$>2 hours;
secondarily refining the glass batch and the refining agent in a second region of the melting tank, wherein in the second region, an average melt temperature $T_2$ is set at 1660° C.<$T_2$≤1720° C., and an average residence time $t_2$ of the melt is set at $t_2$>1 hour, and wherein the proportion of the $SO_3$ forming due to the decomposi- tion of the sulfate compound is decreased to less than 0.002 wt. % at the latest during the conducting of the secondary refining; and high-temperature refining the glass batch and the refining agent after the secondary refining, wherein an average melt temperature $T_3$ during the high-temperature refining stage is $1750°\ C.\leq T_3 \leq 2000°\ C.$ 2. The method according to claim 1, wherein the at least one sulfate compound comprises at least one alkali sulfate and/or at least one alkaline-earth sulfate.

3. The method according to claim 2, wherein the at least one sulfate compound further comprises $Na_2SO_4$.

4. The method according to claim 1, wherein the at least one sulfate compound comprises $Na_2SO_4$.

5. The method according to claim 1, wherein the at least one sulfate compound comprises $BaSO_4$ and/or $CaSO_4$.

6. The method according to claim 1, wherein the at least one sulfate compound is added to the batch in an amount that corresponds to 0.05 to 1 wt. % of $SO_3$.

7. The method according to claim 1, wherein the step of high-temperature refining is conducted at temperatures of at least 1750° C.

8. The method according to claim 1, wherein the step of high-temperature refining is conducted over a time period of at least 12 min.

9. The method according to claim 1, wherein, in the first region, melting is conducted in an oxidizing manner.

10. The method according to claim 1, further comprising adding nitrate to the glass batch in a concentration of 0 to 3 wt. %.

11. The method according to claim 1, wherein the glasses produced are a transparent, colorless glasses.

12. The method according to claim 1, further comprising adding coloring components so that the glasses produced are transparent, colored glasses.

13. The method according to claim 1, further comprising exposing the glass batch to a thermally treatment sufficient to convert the glass batch into a glass ceramic.

* * * * *